United States Patent
Dammann et al.

(10) Patent No.: US 6,398,639 B1
(45) Date of Patent: Jun. 4, 2002

(54) SEGMENTED SIEVE LINING FOR A CONCAVE

(75) Inventors: Martin Dammann; Franz Heidjann, both of Harsewinkel (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 09/591,287

(22) Filed: Jun. 9, 2000

(30) Foreign Application Priority Data

Jun. 10, 1999 (DE) .......................... 199 26 365

(51) Int. Cl.7 .......................... A01F 7/04; A01F 12/26
(52) U.S. Cl. .......................... 460/107; 460/75
(58) Field of Search .......................... 460/75, 107, 108, 460/109, 119

(56) References Cited

U.S. PATENT DOCUMENTS

| | | | | |
|---|---|---|---|---|
| 2,794,438 A | * | 6/1957 | Heth | .......................... 460/109 |
| 3,215,145 A | * | 11/1965 | Zmuda | .......................... 460/113 |
| 3,568,682 A | * | 3/1971 | Knapp | .......................... 460/108 |
| 4,499,908 A | * | 2/1985 | Niehaus | .......................... 460/108 |
| 4,988,326 A | * | 1/1991 | Bennett | .......................... 460/110 |
| 5,024,631 A | | 6/1991 | Heidjann et al. | |

FOREIGN PATENT DOCUMENTS

| | | |
|---|---|---|
| DE | 39 14 962 A1 | 11/1990 |
| DE | 43 25 310 A1 | 2/1995 |
| DE | 195 25 244 A1 | 1/1997 |
| EP | 03 96 968 A1 | 11/1990 |
| JP | 406233621 A * | 8/1994 .......................... 460/108 |

\* cited by examiner

Primary Examiner—Thomas B. Will
Assistant Examiner—Meredith Petravick
(74) Attorney, Agent, or Firm—Husch & Eppenberger, LLC; Robert E. Muir; Richard J. Musgrave

(57) ABSTRACT

A sieve lining for a concave in a threshing mechanism of a harvesting machine accommodates larger threshing cylinders while still allowing the sieve lining segments to be removed through an inspection opening in a threshing mechanism housing and includes an extension formed by either a single piece or segments; a plurality of sieve lining segments; and an articulated connection between the extension and the sieve lining segments.

6 Claims, 3 Drawing Sheets

SEGMENTED SIEVE LINING FOR A CONCAVE

FIELD OF THE INVENTION

The present invention relates generally to agricultural machinery and, more particularly, to a segmented sieve lining for a concave in a threshing mechanism of a harvesting machine.

BACKGROUND OF THE INVENTION

In a combine harvester, a feed conveyor transports crops to be threshed to a threshing mechanism that includes a threshing cylinder and a concave. The width of the feed conveyor is normally less than the width of the threshing cylinder and concave. The feed conveyor extends into the housing of the threshing mechanism to ensure satisfactory transfer of crops. The threshing mechanism housing has an inspection opening located above the outlet end of the feed conveyor. The inspection opening serves, in part, to allow removal of a sieve lining on the concave of the threshing mechanism for maintenance work. European patent EP 0396 968 discloses a concave that is longitudinally divided, forming individual sieve lining sections which can be successively removed from the threshing mechanism housing through the inspection opening. The concave as a whole is mounted so as to be pivotable about a horizontal axis, and can be lowered by means of a linkage from the working position to a non-working position and pivoted back to the working position in the reverse manner.

To increase the output of a combine harvester it is necessary to increase the diameter of the threshing cylinder. This results in a need for a larger concave and sieve lining. A problem arises in that the larger sieve lining is then no longer removable through the inspection opening in the cramped space of the threshing mechanism housing.

SUMMARY OF THE INVENTION

The present invention includes an extension which increases the encompassment of the threshing cylinder by the sieve lining and which is connected with the sieve lining segments without a gap. The sieve lining segments themselves remain small enough to remove through the inspection opening in the threshing mechanism housing. There is an articulated connection between the extension and the sieve lining segments.

In one embodiment, the extension is a single piece. Alternatively, the extension is divided into a plurality of extension segments.

In another embodiment, the articulated connection is a permanent connection, such as a hinge. Another embodiment has a form-locking design in which an angled edge associated with the extension engages with a U-shaped edge associated with the sieve lining segments.

One object of the present invention is to provide a design for a segmented sieve lining such that removal of the sieve lining segments is possible while retaining the cramped spaces in a combine harvester with a threshing cylinder of larger diameter than previous designs.

Another object of the present invention is to provide a sieve lining that accommodates the required size of the concave for added output of the harvester while still allowing the lining segments to be removed from the threshing mechanism housing through the inspection opening.

In accordance with the present invention there is provided a combine harvester having front and rear ends and including a transversely-extending threshing mechanism and a threshing mechanism housing which has an inspection opening at the front thereof, the threshing mechanism including a transversely-extending threshing cylinder and a concave at the bottom of the threshing cylinder, the inspection opening having a width less than a length of the threshing cylinder, the concave including a plurality of sieve lining segments in a side-by-side arrangement generally across the length of the threshing cylinder, each sieve lining segment having a width in the transverse direction which is less than the width of the inspection opening while the total width of all of the abutting sieve lining segments is equal to the concave.

These and other objects, aspects, features and advantages of the present invention will become apparent from the following detailed description when taken in conjunction with the reference drawings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
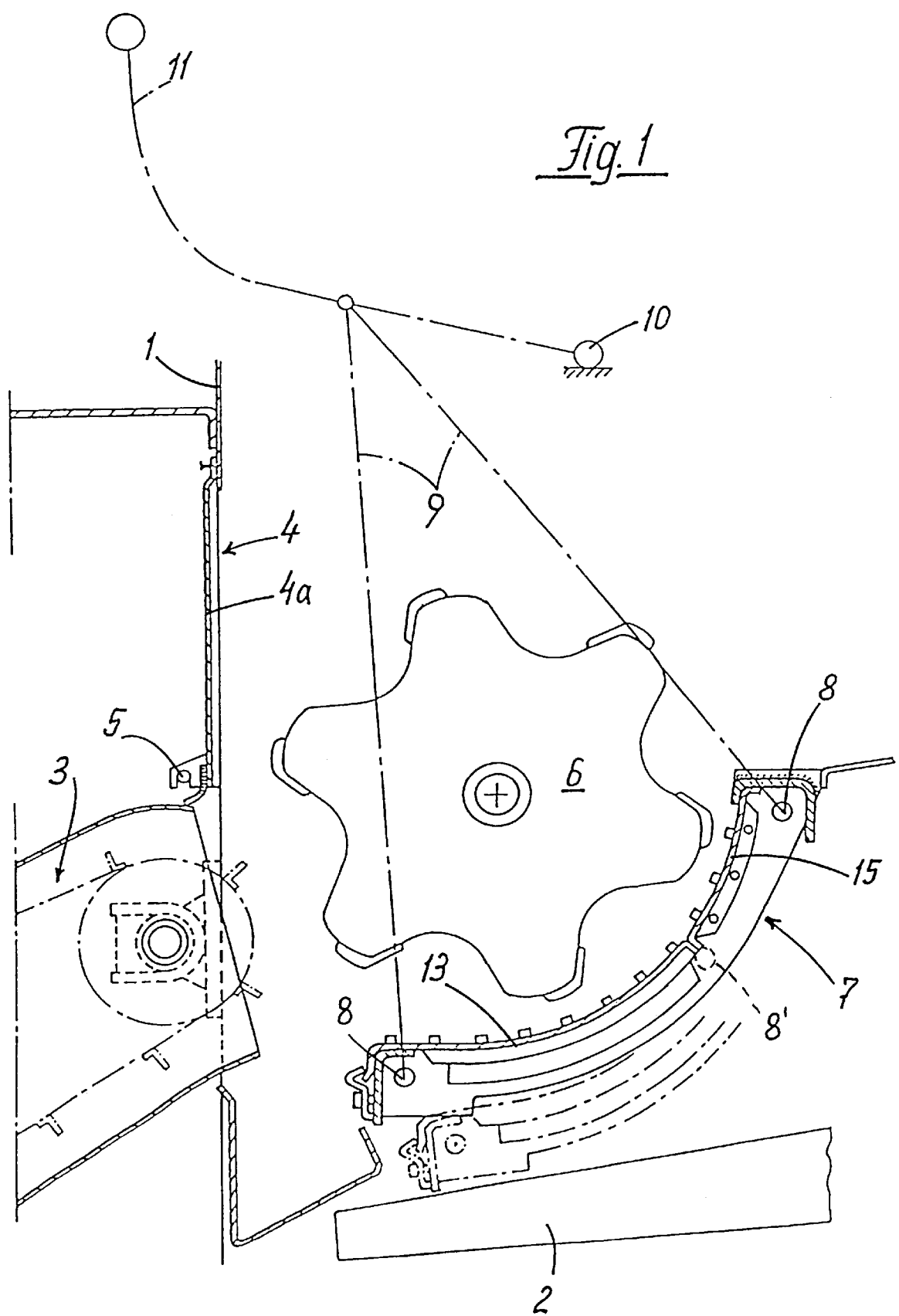
FIG. 1 is a schematic view of a threshing mechanism in a harvesting machine including an outlet end of a feed conveyor, a threshing cylinder, and a concave.
Figure 2:
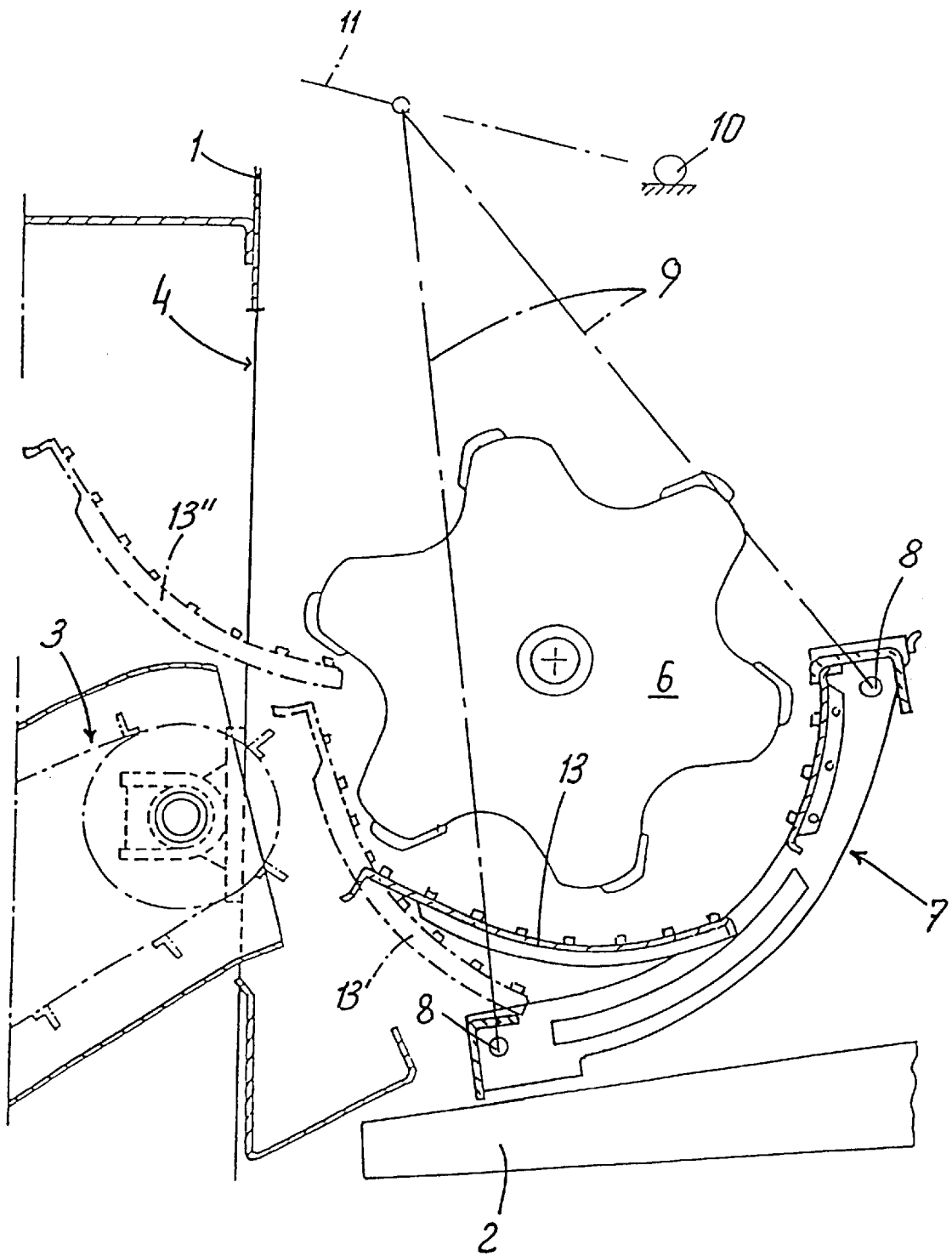
FIG. 2 is a view corresponding to FIG. 1, but with the concave lowered and showing removal of a sieve lining section in different positions.

A combine harvester (not shown in detail) generally has front and rear ends, a longitudinal cleaning device 2, and a transverse threshing cylinder 6. FIGS. 1 and 2 are schematic views of the combine harvester showing a front wall 1 of a threshing mechanism housing having an opening 4 therein. A feed conveyor 3, also known as a front elevator, feeds harvested crop through the lower portion of front wall opening 4. A cover 4a provides a closure for the portion of opening 4 above the feed conveyor 3. This portion of opening 4 is herein sometimes called an inspection opening. The closure cover 4a is mounted at its bottom edge by two lateral studs 5. The threshing cylinder 6 with its axis running transversely to the direction of travel is located in the threshing mechanism housing. As shown, a concave 7 is located roughly over the bottom right portion of the periphery of the threshing cylinder 6. The concave 7 is pivotably mounted on trunnions 8 arranged in its rear edge region and parallel to the cylinder axis. Two link rods 9 support the front region of the concave 7 and are linked to an operating lever 11 mounted in a bearing 10.

Figure 3:
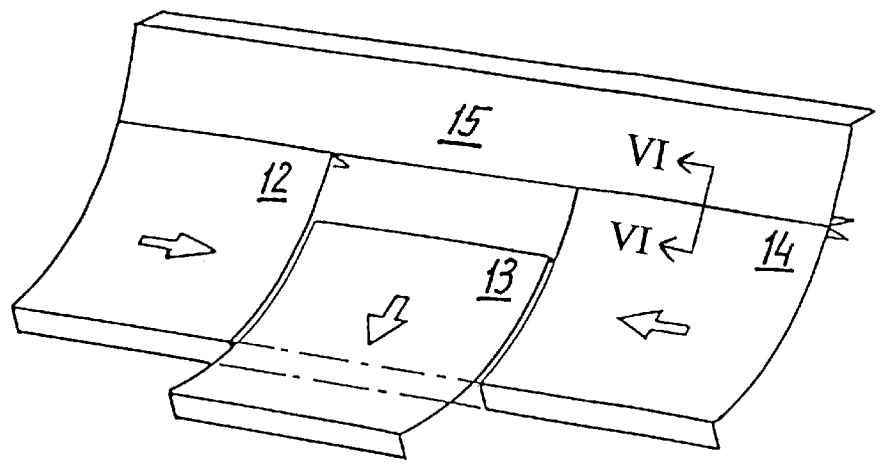
FIG. 3 shows the concave of the combine harvester according to the invention in a first embodiment.
Figure 4:
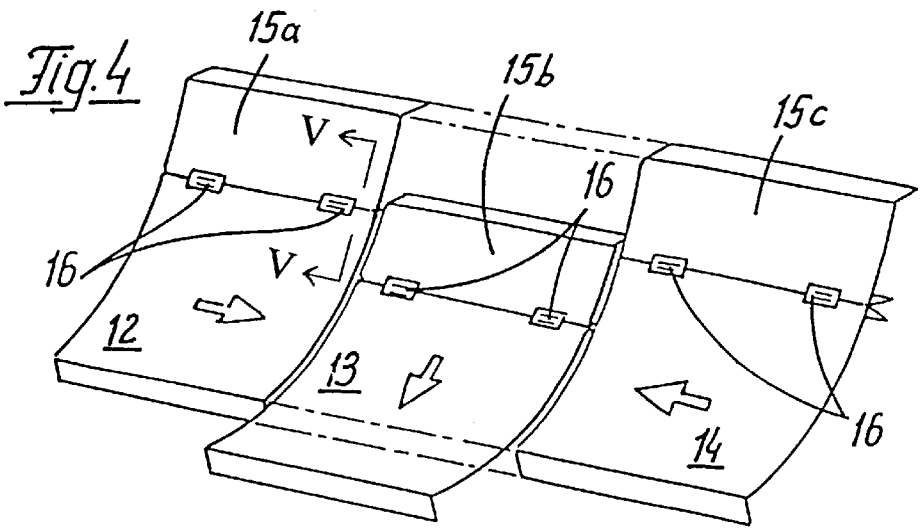
FIG. 4 shows another embodiment of the concave of the combine harvester according to the invention.
Figure 5:
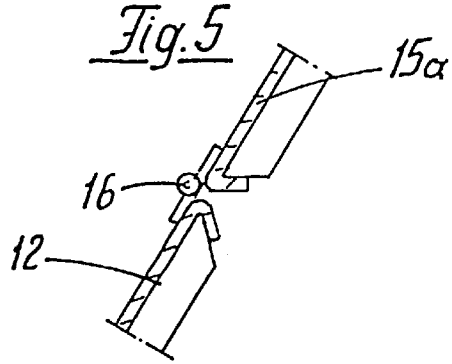
FIG. 5 is a cross-sectional view taken generally along line V—V in FIG. 4.
Figure 6:
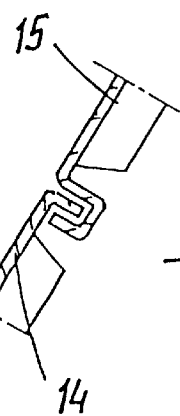
FIG. 6 is a cross-sectional view taken generally along line VI—VI in FIG. 3.

Two different embodiments of the sieve lining are shown in FIGS. 3 and 4. The sieve lining in both embodiments includes three sieve lining front segments 12, 13 and 14 which are arranged side-by-side in a row in the axial direction of the threshing cylinder 6. FIG. 3 shows a one-piece rear portion 15 connected to the sieve lining front segments 12, 13, 14 in order to obtain an adequate angle of wrap for the threshing cylinder 6. The width of the rear portion 15, as measured transverse to the combine harvester, corresponds to the total width of the concave 7. FIGS. 1 and 2 illustrate how the threshing cylinder 6 is encompassed by the interconnected combination of the rear portion 15 and the sieve lining front segments 12, 13, 14. As shown in FIG. 6, the connection is a form-locking relationship. This design creates the possibility of the connection being made without mechanical connecting elements and no tools being necessary for removal of the sieve lining front segments 12, 13, 14. The form-locking relationship shown in FIG. 6 includes U-shaped edges associated with the sieve lining front segments 12, 13, 14 which open towards the threshing cylinder 6. The associated edge of the rear portion 15 is angled, so that it extends into the U-shaped region of each sieve lining front segment 12, 13, 14.

In contrast to the embodiment shown in FIGS. 3 and 6 where the rear portion 15 is constructed in one piece, FIG. 4 shows an embodiment in which the rear portion consists of three individual removable rear portions 15a, 15b, 15c. The sieve lining front segments 12, 13, 14 are joined with the individual rear portions 15a, 15b, 15c by an articulated connection. In the illustrated embodiment, this connection is formed by hinges 16. In this embodiment there is conveniently a laterally extending support 8' located as shown in FIG. 1 to provide support for the joined segments such as 13 and 15b. Other supports may be utilized.

To dismantle the sieve lining front segments 12, 13, 14, the closure cover 4a is removed. Next, the concave is pivoted into the lower position, as shown in phantom lines in FIG. 1 and in solid lines in FIG. 2, by means of the operating lever 11. Next, the central sieve lining front segment 13 is lifted and then pulled forward, as shown in FIG. 2. Intermediate positions of removal of sieve lining front segment 13 are shown in phantom lines and indicated by the reference numbers 13' and 13". The two lateral sieve lining front segments 12, 14 are removed in the same way, but are first moved to the center, as shown by the arrows in FIGS. 3 and 4. In the FIG. 4 embodiment the individual rear portions 15a, 15b, 15c are removed at the same time as the associated sieve lining front sections 12, 13, 14. This is possible due to the articulated connection which allows the portions to be pivoted toward each other. In the embodiment shown in FIG. 3, the rear portion 15 remains in the fixed position when the sieve lining front segments 12, 13, 14 are removed. Separation of the segments occurs when the respective sieve lining front segment 12, 13, or 14 is lifted and the connection is disengaged. Replacement of the sieve lining front segments 12, 13, 14 is effected in the reverse order.

The invention is not confined to the embodiments shown. In a preferred embodiment, the concave 7 consists of at least two sieve lining front segments 12, 13 connected to the rear portion 15 which increases the sieve area. It is not necessary for the rear portion 15 or rear portions 15a, 15b, 15c to be arranged behind the sieve lining front sections 12, 13, 14, as seen in the direction of flow of the material to be threshed. They could instead be located in front of sieve lining segments.

In summary, the combine harvester has front and rear ends and includes a transversely-extending threshing cylinder 6 and a concave 7 at the bottom of the threshing cylinder. The threshing mechanism housing has an inspection opening at the front thereof closed by a cover 4a, the inspection opening has a width less than the length of the threshing cylinder 6 as measured in the transverse direction, i.e. the cylinder's axial direction. The concave includes a plurality of sieve lining front segments 12, 13, 14 in a side-by-side arrangement generally across the length of the threshing cylinder 6, each sieve lining front segment 12, 13, 14 has a width in the transverse direction which is less than the width of the inspection opening while the total width of all of the abutting sieve lining front segments is equal to the concave 7 or the length of the threshing cylinder 6.

Other objects, features and advantages of the present invention will be apparent to those skilled in the art. While preferred embodiments of the present invention have illustrated and described, this has been by way of illustration and the invention should not be:limited except as required by the scope of the appended claims.

We claim:

1. In a combine harvester with a threshing cylinder and a concave within a threshing mechanism housing which has an inspection opening, the concave having a plurality of abutting segmented front portions and a laterally extending rear portion, each of the front portions having a width less than the inspection opening whereby the front portions are removable through the inspection opening, the laterally extending rear portion being constructed and arranged so that it is not removable through the inspection opening, the abutting front portions having a total width that is equal to the width of the concave, the rear portion having a laterally extending width equal to the total width of the front portions of the concave, and means for releasably connecting the abutting front portions to the rear portion.

2. The combination as set forth in claim 1, wherein the means for releasably connecting is formed by an interaction between a U-shaped edge and an angled edge which is designed to engage in the U-shaped edge.

3. The combination as set forth in claim 2, wherein the U-shaped edge is associated with the front portions and the angled edge is associated with the rear portion.

4. In a combine harvester with a threshing cylinder and a concave within a threshing mechanism housing which has an inspection opening, the concave having a plurality of segmented front portions and of laterally extending segmented rear portions equal in number to the front portions, each of the front portions being of a width less than the inspection opening while the total width of all of the front portions is equal to the width of the concave, each rear portion having a width equal to the width of the corresponding front portion, and an articulated connection interconnecting each rear portion to the corresponding one of the front portions, whereby each front portion and its connected rear portion are together removable through the inspection opening.

5. The combination as set forth in claim 4, wherein the articulated connections are permanent.

6. The combination as set forth in claim 5, wherein the permanent articulated connections are hinges.

* * * * *